US006216154B1

(12) United States Patent
Altschuler et al.

(10) Patent No.: US 6,216,154 B1
(45) Date of Patent: Apr. 10, 2001

(54) METHODS AND APPARATUS FOR ENTERING AND EVALUATING TIME DEPENDENCE HYPOTHESES AND FOR FORECASTING BASED ON THE TIME DEPENDENCE HYPOTHESES ENTERED

(75) Inventors: Steven J. Altschuler, Redmond, WA (US); David Ingerman, New York, NY (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/065,963

(22) Filed: Apr. 24, 1998

(51) Int. Cl.$^7$ ...................................... G06F 17/30
(52) U.S. Cl. .................... 709/203; 709/217; 709/223; 707/5
(58) Field of Search .................. 707/5; 709/223, 709/217–219, 203

(56) References Cited

U.S. PATENT DOCUMENTS

| | | | | |
|---|---|---|---|---|
| 5,452,440 | * | 9/1995 | Salsburg | 711/136 |
| 5,727,129 | * | 3/1998 | Barrett et al. | 706/10 |
| 5,802,292 | * | 9/1998 | Mogul | 709/203 |
| 5,924,116 | * | 7/1999 | Aggarwal et al. | 711/122 |

OTHER PUBLICATIONS

Markatos ("A Top–10 Approach to Prefetching on the Web", Institute of Computer Science Aug. 1996, pp. 1–15).*
Grimsrud ("Multiple prefetch adaptive disk caching", IEEE Transactions on Knowledge and Data Engineering, vol. 5, No. 1, Feb. 1993, pp. 88–103)*

* cited by examiner

Primary Examiner—Thomas G. Black
Assistant Examiner—William Trinh
(74) Attorney, Agent, or Firm—Michaelson & Wallace; Peter L. Michaelson

(57) ABSTRACT

Entering and evaluating group(s) of similar dependence hypotheses, such as time dependence hypotheses, and forecasting values of a variable based on the group(s) of similar dependence hypotheses. The group(s) of similar dependence hypotheses may be used to forecast requests for an Internet resource or Internet resources having one or more particular attributes. The entered group(s) of similar dependence hypotheses may be evaluated based on known data, such as past requests for Internet resources or Internet resources of a particular type.

28 Claims, 11 Drawing Sheets

(4 of 11 Drawing Sheet(s) Filed in Color)

| VARIABLE VALUE | | TIME |
|---|---|---|
| RESOURCE IDENTIFICATION — 412 | ATTRIBUTE TYPE(S) — 414 | DATE/TIME STAMP |
| gridiron.com | sports,football,html | 09/30/97 12:51 |
| gridiron.com/interview | sports,football,mpeg | 09/30/97 12:52 |
| gridiron.com/interview.car.ad | auto,advertisement,jpeg | 09/30/97 13:05 |
| ... | ... | ... |

410 — VARIABLE VALUE
420 — TIME
422 — (DATE/TIME STAMP)

METHODS AND APPARATUS FOR ENTERING AND EVALUATING TIME DEPENDENCE HYPOTHESES AND FOR FORECASTING BASED ON THE TIME DEPENDENCE HYPOTHESES ENTERED

§1. BACKGROUND OF THE INVENTION

§1.1 Field of the Invention

The present invention concerns time dependency of certain variables such as, for example, the time dependency of the use of (e.g., requests for) Internet resources. In particular, the present invention concerns entering and evaluating time dependency hypotheses and forecasting variable values based on the time dependency hypotheses.

§1.2 Related Art

People rely on forecasting, of one type or the other, in many ways. For example, people may rely on weather forecasts to determine what to wear or what crops to plant, people may rely on forecasts of a stock market index or of a particular company's earnings when investing money, and companies may rely on demand forecasts when deciding what and how many products to produce. Forecasting or predictions also extend to less essential issues, such as what team will win this week's football game or what movie will win this year's Academy Award.

Some forecasts are made by detecting temporal patterns in known data and extrapolating the data forward based on the detected patterns. For example, a forecast of the number of people making a telephone call during a particular time period in a day may be made based on detected temporal patterns in historical data of the number of people making telephone calls during that particular time period in past days.

One general purpose of forecasting is to predict what people will want in the future so that those wants can be met. For example, in the context of networked computers, such as the Internet, resource servers (also referred to as "web sites" or "Internet sites") service requests for content (e.g., documents, HTML ("Hyper Text Mark-up Language") pages, JPEG ("Joint Photographic Experts Group" encoded) images, MPEG ("Motion Picture Experts Group" encoded) video, audio information, etc.) from clients. If client requests can be accurately forecast, resource servers may be adapted to service such client requests in a more efficient (e.g., in terms of ease of navigation, download time, availability, etc.) manner.

Forecasts of requests for Internet resources may be made based on the resource itself, or one or more attributes of the resources. Different Internet resources may have different attributes. For example, an Internet resource providing a stock market report may have "FINANCIAL" and "HTML" attributes, an Internet resource providing an image of a famous painting may have "ART" and "JPEG" attributes, and a video clip of baseball highlights may have "SPORTS" and "MPEG" attributes.

FIG. 1a is a notional plot 110 of requests for an Internet resource which provides an interactive game, over time. As shown in FIG. 1a, requests may increase after working hours and increase dramatically (See 115a and 115b) during the weekends. FIG. 1b is a notional plot 120 of requests for an Internet resource which provides a download for a computer program, over time. If the download is provided for free during a certain time period, a spike 125 in requests may occur during that time period. FIG. 1c is a notional plot 130 of requests for an Internet resource having content which is updated every Wednesday. As shown in FIG. 1c, requests may increase on Wednesdays (See 135a and 135b) and taper off for the rest of the week.

As can be seen from the above examples, the temporal properties of Internet resource requests may depend on the attributes of those resources. If the number of attributes is relatively small, such patterns might be readily discernable merely by looking at temporal patterns in the plots of data (e.g., requests). However, large Internet sites may have resources with thousands of attributes. Thus, a tool is needed to automatically forecast requests for Internet resources.

One of the most popular time series models used in forecasting is the seasonal ARIMA (or Auto-Regressive Integrated Moving Average) model. Unfortunately, however, a fundamental assumption of the ARIMA model makes it unsuitable for forecasting events which exhibit non-homogeneous time intervals (e.g., different patterns on weekdays and weekends). It is believed that requests for Internet resources are not time-homogeneous. Thus, a tool for forecasting events that are not time-homogeneous is needed.

§2. SUMMARY OF THE INVENTION

The present invention provides a user interface for permitting non-time-homogeneous forecast hypotheses to be entered. The user interface permits the entry of groups of similar dependence hypotheses. A dependence hypothesis may be a pair of variables (e.g., times) where a value associated with the second variable (e.g., time) is expected to be significantly dependent on a value associated with the first variable (e.g., time). Similar dependence hypotheses are expected to have similar dependence over all of the hypotheses. In the context of the Internet for example, the number of requests for a resource on Tuesday night may be expected to depend on the number of requests for that resource on Monday night, and the number of requests for the resource on Wednesday night may be expected to similarly depend on the number of requests for the resource on Tuesday night.

The present invention also tests the groups of similar dependence hypotheses against historical data and to provide a indication of the validity of the groups of similar dependence hypotheses. More specifically, the present invention may present a display of (i) a scatter diagram of historical data related to a group of similar dependence hypotheses, (ii) correlations of various groups of similar dependence hypotheses to historical data, and (iii) forecasts of values.

Further, the present invention also determines how various groups of historical data (e.g., requests for various resources or resources having various attributes) fit a given group(s) of similar dependence hypotheses.

Finally, the present invention provides a tool which permits a user to interactively explore data to discover unforeseen patterns.

§3. BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIG. 4 is a diagram which depicts exemplary notional records of Internet usage data which may be used by the present invention.

FIG. 5a is a diagram which depicts an exemplary user interface for accepting one or more groups of similar dependence hypotheses. FIG. 5b depicts the user interface of FIG. 5a having entered groups of similar dependence hypotheses.

§4. DETAILED DESCRIPTION

Figure 1A:
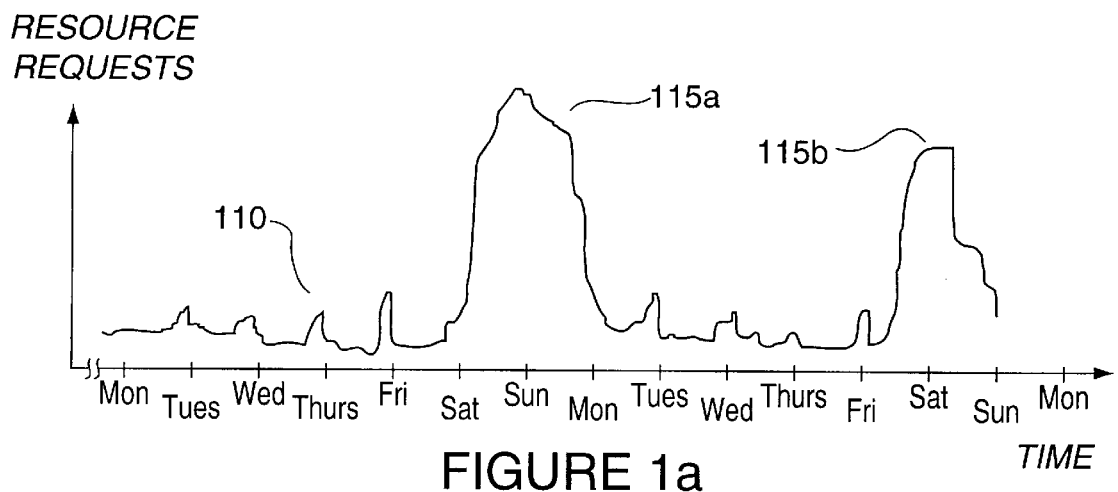
FIGS. 1a through 1c are notional plots of requests for Internet resources verses time.
Figure 1B:
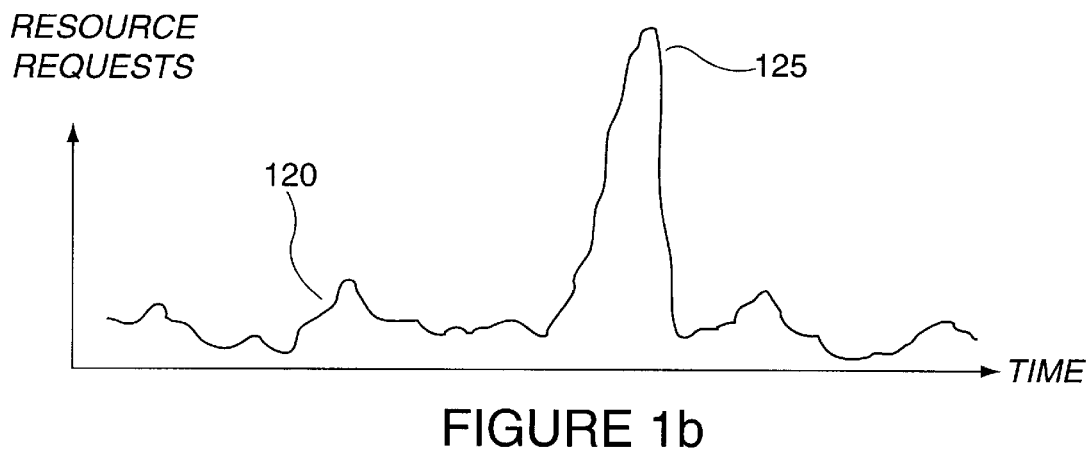
Figure 1C:
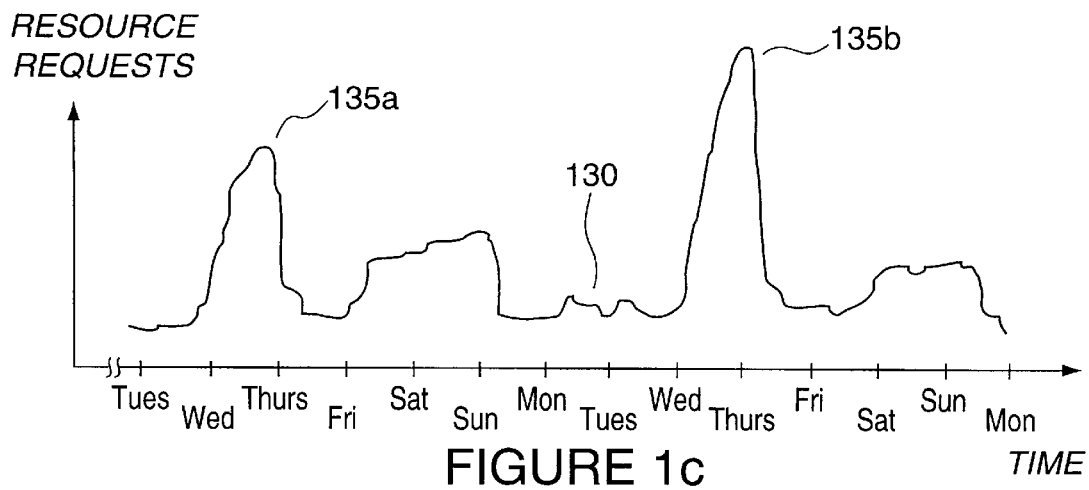

The present invention concerns a novel tool for entering and evaluating forecast hypotheses, in particular forecast hypotheses that are not time-homogeneous. The present invention also concerns a novel tool for forecasting variable values based on time dependent hypotheses. The following description is presented to enable one skilled in the art to make and use the invention, and is provided in the context of a particular application (e.g., forecasting requests for Internet resources having a particular attribute(s)) and its requirements. Various modifications to the embodiment will be apparent to those skilled in the art, and the general principles set forth below may be applied to other embodiments and applications. Thus, the present invention is not intended to be limited to the embodiment shown.

In the following, the functions of the present invention are first presented. Then, an exemplary structure for practicing the present invention is presented. Finally, an example of the operation of the present invention is presented.

§4.1 FUNCTION OF THE PRESENT INVENTION

Patterns in a time series are often clear to humans. However, determining such patterns algorithmically is challenging and costly. The present invention facilitates the use of human knowledge and heuristics to reduce the search times and improve the accuracy of algorithmic forecasting tools. For example, humans may predict that people may request an Internet site having movie reviews more often on Thursday so that they can see reviews of new movies being released on Friday. This predication (or hypothesis) is used to aid algorithmic forecasting tools to detect patterns in the usage of the Internet site.

A first function of the present invention is to provide a user interface for permitting non-time-homogeneous forecast hypotheses to be entered. The user interface permits the entry of groups of similar dependence hypotheses. A dependence hypothesis may be a pair of variables (e.g., times) where a value associated with the second variable (e.g., time) is expected to be significantly dependent on a value associated with the first variable (e.g., time). Similar dependence hypotheses are expected to have similar dependence over all of the hypotheses. In the context of the Internet for example, the number of requests for a resource on Tuesday night may be expected to depend on the number of requests for that resource on Monday night, and the number of requests for the resource on Wednesday night may be expected to similarly depend on the number of requests for the resource on Tuesday night.

A second function of the present invention is to test the groups of similar dependence hypotheses against historical data and to provide a indication of the validity of the groups of similar dependence hypotheses. More specifically, the present invention may present a display of (i) a scatter diagram of historical data related to a group of similar dependence hypotheses, (ii) correlations of various groups of similar dependence hypotheses to historical data, and (iii) forecasts of values.

A third function of the present invention is to determine how various groups of historical data (e.g., requests for various resources or resources having various attributes) fit a given group(s) of similar dependence hypotheses.

A fourth function of the present invention is to provide a tool which permits a user to interactively explore data to discover unforeseen patterns.

§4.2 EXEMPLARY STRUCTURE FOR PRACTICING THE PRESENT INVENTION

Figure 2:
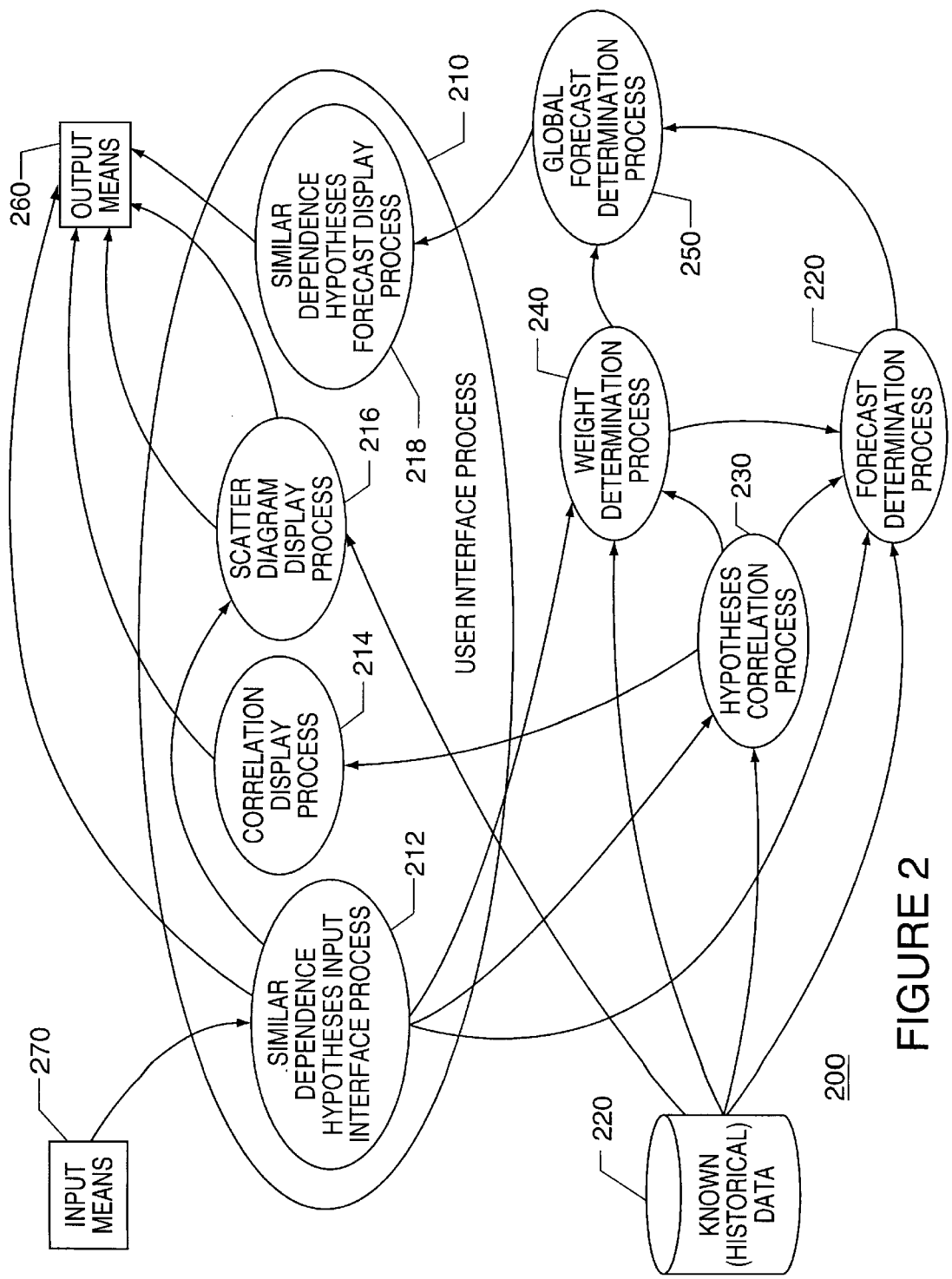
FIG. 2 is a diagram of processes that may be used to carry out the present invention.

FIG. 2 is a diagram of processes which may be used in an exemplary embodiment 200 of the present invention. As shown in FIG. 2, the present invention may include, or may interact with, known (historical) data 280, output means 260, and input means 270. The present invention may also include a user interface process (or more generally, a user interface) 210, a forecast determination process (or more generally, a forecast generator) 220, a hypothesis correlation process (or more generally, a hypothesis correlator) 230, a weight determination process (or more generally, a weight generator) 240, and a global forecast determination process (or more generally, a global forecast generator) 250. The user interface process 210 may include a similar dependence hypotheses input interface process (or more generally, a hypotheses input interface) 212, a correlation display process (or more generally, a correlation display generator) 214, a scatter diagram display process (or more generally, a scatter diagram display generator) 216, and a similar dependence hypotheses forecast display process (or more generally, a forecast display generator) 218.

Figure 3:
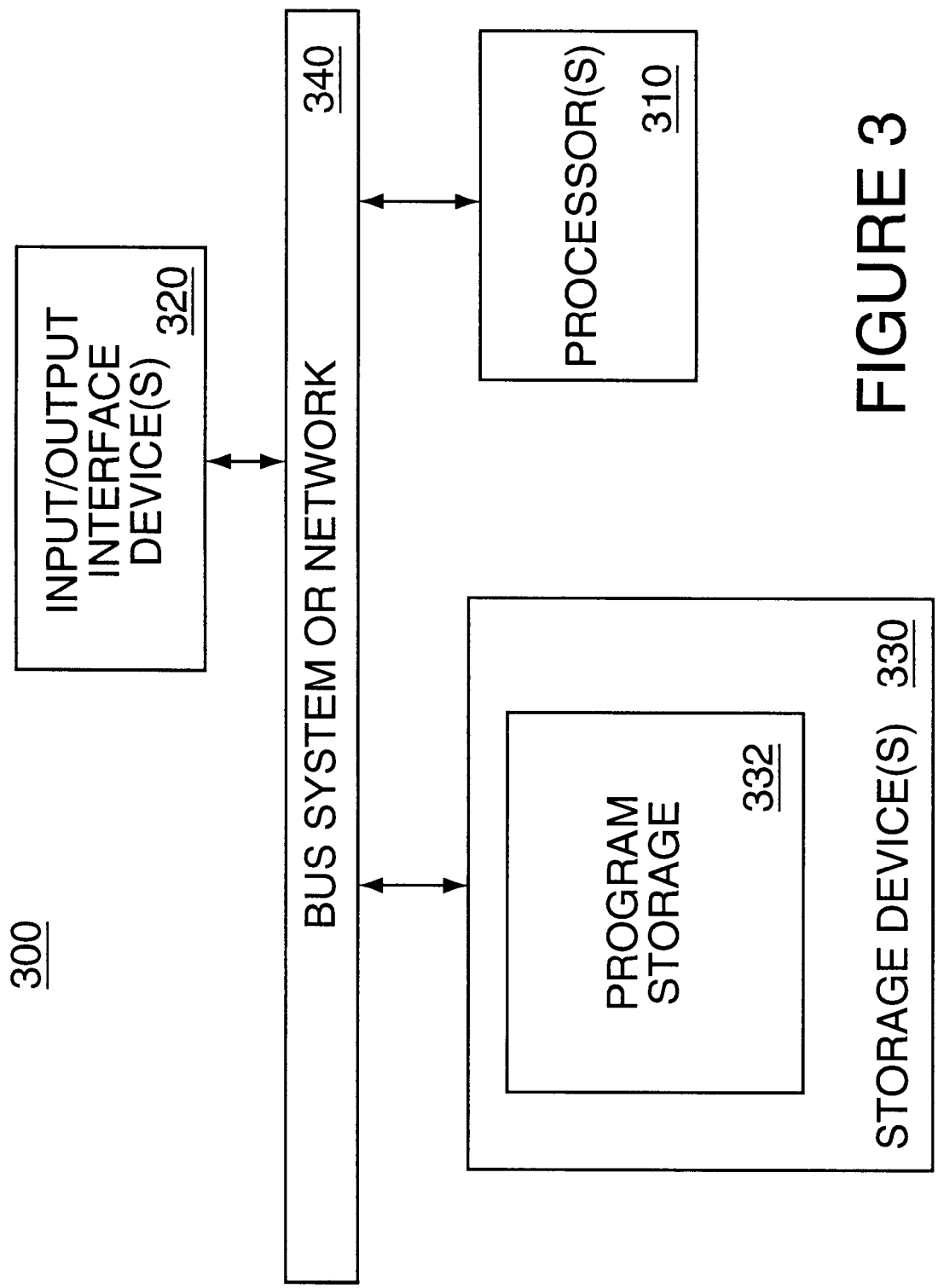
FIG. 3 is a high level block diagram of a device which may be used to carry out the present invention.

Referring to FIG. 3, the processes depicted in FIG. 2 may be carried out by a machine 300 which may include a processor(s) 310, an input/output interface device(s) 320, and a storage device(s) 330, each of which may be coupled with a bus system or network 340. The processes may be machine executable instructions executed by the processor (s) 310. The machine executable instructions may be stored in a program storage 332 area of the storage device(s) 330, or may be provided from an external source via the input/output interface device(s) 320. Referring back to FIGS. 2 and 3, the known historical data 280 may be stored on the storage device(s) 330 or may be received from an external source via the input/output interface device(s) 320. The input means 270 may be a keyboard, mouse, etc. coupled with the machine 300 via an appropriate one of the input/output interface device(s) 320. The output means 260 may be a video monitor coupled with the machine 300 via an appropriate one of the input/output interface device(s) 320 (e.g., a video driver).

As shown in FIG. 4, the known (historical) data 280 may be Internet usage data. FIG. 4 depicts notional records of Internet usage data 400. The records may include a resource identification field 412, an attribute type(s) field 414, and a date and time stamp field 422. The resource identification field 412 and the attribute type(s) field 414 may be thought of more generally as a variable value field 410. The date and time stamp field may be thought of more generally as a time field 420. Thus, although the known (historical) data is provided in the context of Internet resources having various attributes, the present invention may be applied to other types of data, such as stock market prices, precipitation, interest rates, etc. that may change with time. The Internet usage data 400 may include other fields (not shown).

In the notional example shown, the first resource is the home page a football Internet site—www.gridiron.com. This first resource has attribute types of "sports" in general and "football" in particular, and is composed in hypertext markup language or "HTML". This first resource was requested at 12:51 PM on Sep. 30, 1997. The second resource is a video interview, for example, with a popular football player, at the football Internet site—www.gridiron.com/interview. This second resource also has attribute types of "sports" in general and "football" in particular and is compressed in accordance with the Motion Pictures Expert Group, or MPEG, compression algorithm. This second resource was requested at 12:52 PM on Sep. 30, 1997. Finally, the third resource is a car advertisement which includes a picture of the car and which may include a hypertext link to an Internet site of car manufacturer. This third resource has attribute types of "auto" and "advertisement" and is compressed in accordance with the Joint Photographic Experts Group, or JPEG, compression algorithm. This third resource was requested at 1:05 PM on Sep. 30, 1997.

The attribute type(s) associated with the resource may also include hypothesis dependencies. That is, clusters of resources having similar hypothesis dependencies may be associated with a common attribute. For example, the number of requests for an Internet site related to income tax filings and the number of requests for an Internet site related to purchasing flowers may both be highly correlated with the number of requests for each site the preceding year (e.g., last April 14 and last December or last Mother's Day and last Valentine's Day). Thus, although the subject matter of Internet sites related to income tax filing and ordering flowers are unrelated, these sites may have a common attribute—namely requests highly correlated with last year's requests.

Similarly, final groupings of hypothesis dependencies may be used for clustering attribute types. More specifically, attributes may be scatter plotted and clustered.

Figure 5A:
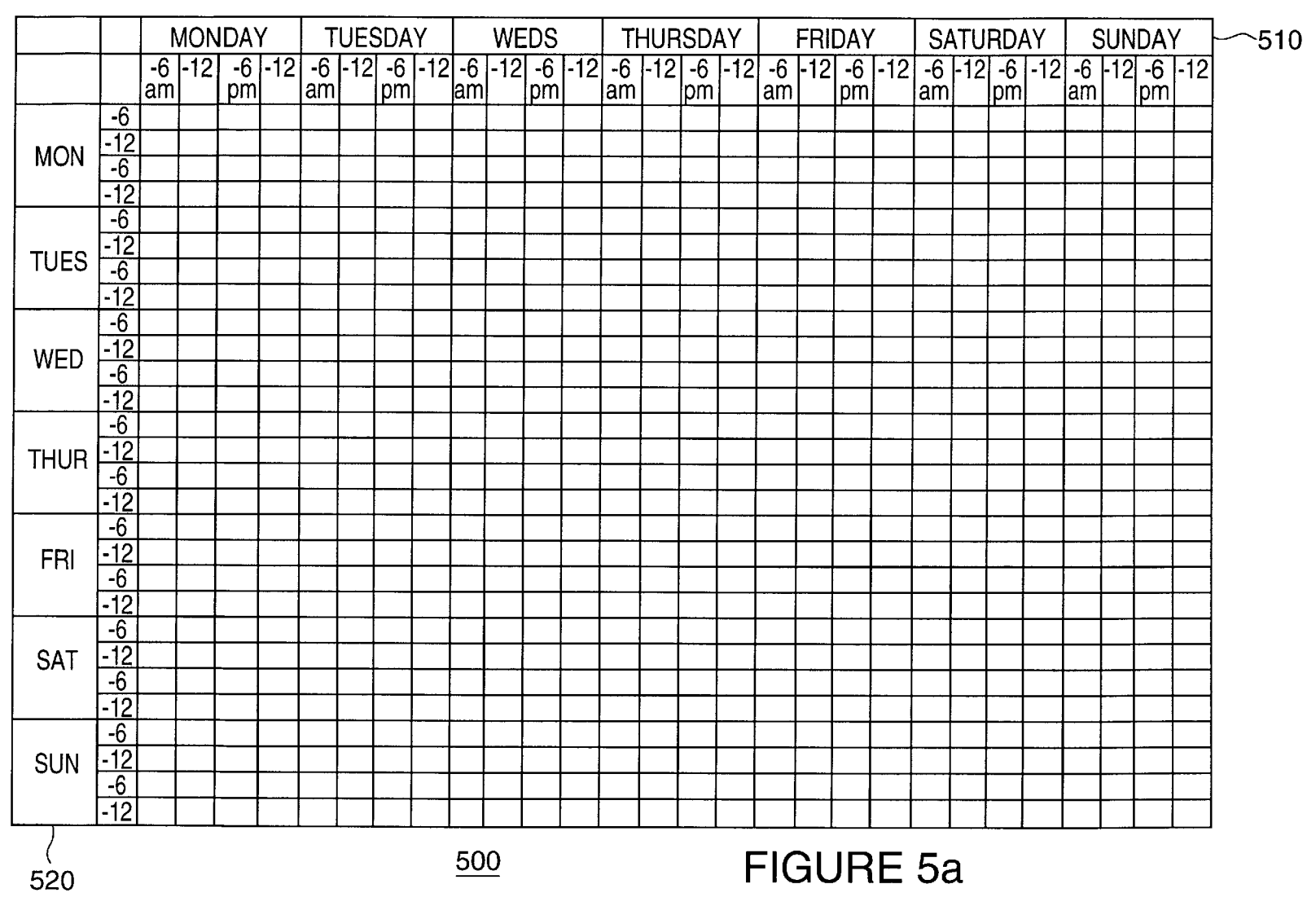

FIG. 5a is a diagram which depicts an exemplary user interface for inputting one or more similar dependence hypotheses. In the exemplary application discussed, the number of requests for Internet resources having a particular attribute is to be forecast. Referring to FIG. 5a, the first row of the table 500 includes the days of the previous week 510, and the first column includes the days of the upcoming week 520. Each of the days is divided into four (4) equal six (6) hour time slots, namely: (i) 12 midnight to 6 AM; (ii) 6 AM to 12 noon; (iii) 12 noon to 6 PM; and (iv) 6 PM to 12 midnight. Although, in the exemplary table 500 shown, each day has four (4) equal time slots, each day may have unequal time slots (e.g., a five (5) hour time slot from 5 AM to 10 AM, a seven (7) hour time slot from 10 AM to 5 PM, a three (3) hour time slot from 5 PM to 8 PM, another three (3) hour time slot from 8 PM to 11 PM and a two (2) hour time slot from 11 PM to 1 AM). Moreover, different days may have different time slots. Furthermore, although, in the exemplary table 500 shown, the past seven (7) days and the next seven (7) days are shown, other time periods and gradations of time may be used (e.g., 12 months of a year, 30 days of September, etc.).

Figure 5B:
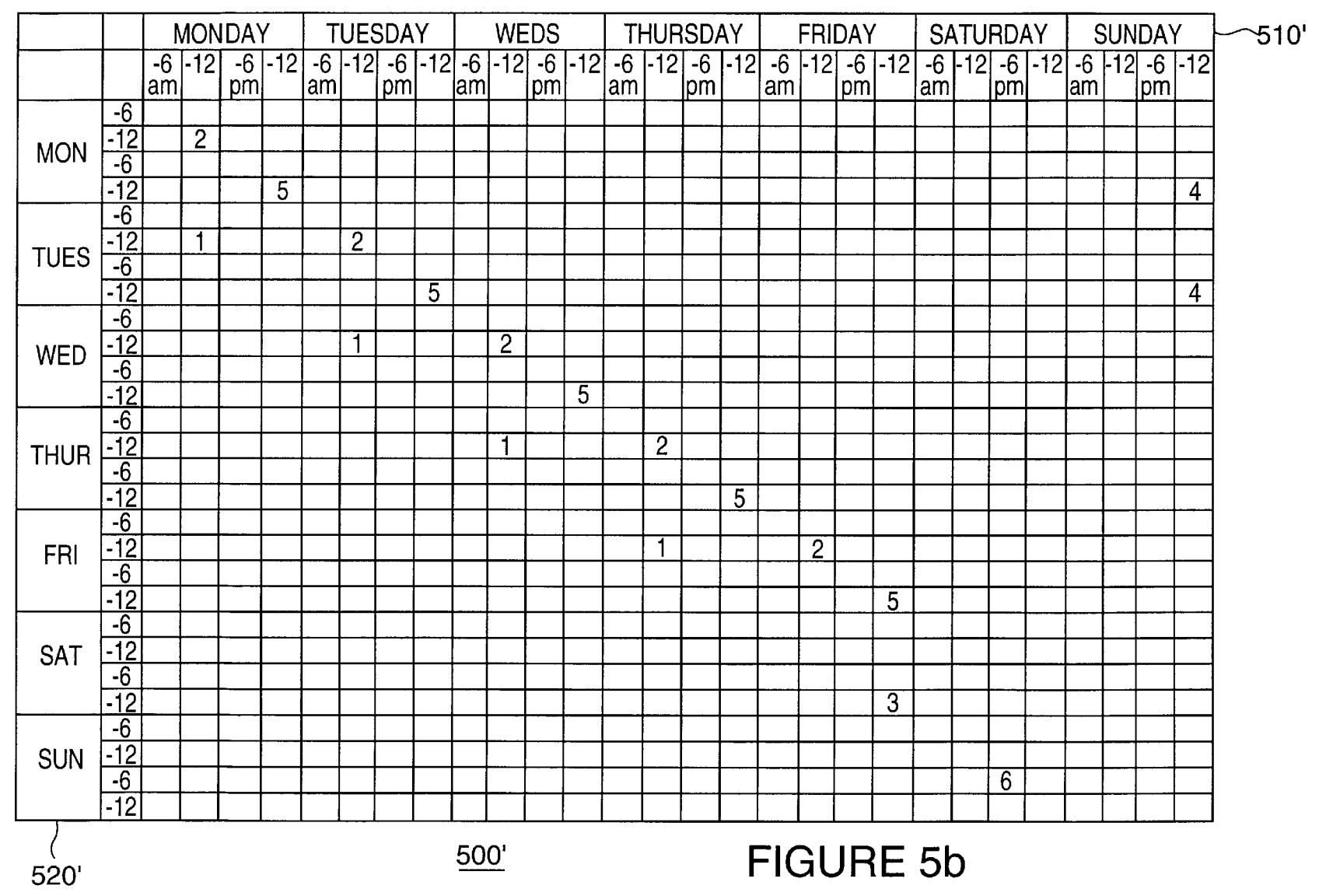

Referring back to FIG. 2, the similar dependence hypotheses input interface process 212 accepts inputs from input means 270. FIG. 5b depicts table 500' of the user interface having six (6) entered groups of similar dependence hypotheses. Similar dependence hypotheses of a common group are denoted by the same number. As will be described later with reference to FIGS. 7a through 7d, in one embodiment, similar dependence hypotheses of a common group are depicted by a common color.

As shown in FIG. 5b, in the first group, the number of requests for Internet resources of a particular attribute type on Tuesday from 6 AM to 12 noon, is expected to depend on the number of requests for Internet resources of that attribute type on the previous Monday (i.e., one day before Tuesday), from 6 AM to 12 noon. Similarly, the number of requests for Internet resources of the particular attribute type on Wednesday from 6 AM to 12 noon, is expected to depend on the number of requests for Internet resources of that attribute type on the previous Tuesday (i.e., one day before Wednesday), from 6 AM to 12 noon; the number of requests for Internet resources of the particular attribute type on Thursday from 6 AM to 12 noon, is expected to depend on the number of requests for Internet resources of that attribute type on the previous Wednesday (i.e., the day before Thursday), from 6 AM to 12 noon; and the number of requests for Internet resources of the particular attribute type on Friday from 6 AM to 12 noon, is expected to depend on the number of requests for Internet resources of that attribute type on the previous Thursday (i.e., the day before Friday), from 6 AM to 12 noon. Basically, each hypothesis of the first group assumes that the requests for Internet resources having a particular attribute type on weekday mornings will depend on the number of requests for that type of Internet resource during the preceding weekday morning.

In the second group of similar dependence hypotheses, the number of requests for resources having the particular attribute on Monday from 6 AM to 12 noon is assumed to depend on the number of requests for resources having the particular attribute on the previous Monday from 6 AM to 12 noon. Similarly, the number of requests for resources having the particular attribute on Tuesday from 6 AM to 12 noon is assumed to depend on the number of requests for resources having the particular attribute on the previous Tuesday from 6 AM to 12 noon, the number of requests for resources having the particular attribute on Wednesday from 6 AM to 12 noon is assumed to depend on the number of requests for resources having the particular attribute on the previous Wednesday from 6 AM to 12 noon, the number of requests for resources having the particular attribute on Thursday from 6 AM to 12 noon is assumed to depend on the number of requests for resources having the particular attribute on the previous Thursday from 6 AM to 12 noon, and the number of requests for resources having the particular attribute on Friday from 6 AM to 12 noon is assumed to depend on the number of requests for resources having the particular attribute on the previous Friday from 6 AM to 12 noon. Basically, each hypothesis of the second group assumes that the number of requests Internet resources having a particular attribute type of on a weekday morning will depend on the number of requests for that type of Internet resource during that same weekday morning in the previous week.

The third "group" of similar dependence hypotheses only includes one hypothesis; namely, the number of requests for Internet resources of the particular attribute on Saturday from 6 PM to 12 midnight is assumed to depend on the number of requests for Internet resources having the attribute on the previous Friday (i.e., one day before Saturday) from 6 PM to 12 midnight.

The fourth group of similar dependence hypotheses assumes that the number of requests for Internet resources of the particular attribute type on Mondays and Tuesdays from 6 PM to 12 midnight will depend on the number of requests for Internet resources having the attribute from 6 PM to 12 midnight on the previous Sunday.

The fifth group of similar dependence hypotheses includes a hypothesis that the number of requests for Internet resources having the particular attribute on Monday from 6 PM to 12 midnight is assumed to depend on the number of requests for Internet resources having the particular attribute on the previous Monday from 6 PM to 12 midnight. Similarly, the number of requests for Internet resources having the particular attribute on Tuesday from 6 PM to 12 midnight are assumed to depend on the number of requests for Internet resources having the particular attribute on the previous Tuesday from 6 PM to 12 midnight, the number of requests for Internet resources having the particular attribute on Wednesday from 6 PM to 12 midnight are assumed to depend on the number of requests for Internet resources having the particular attribute on the previous Wednesday from 6 PM to 12 midnight, the number of requests for Internet resources having the particular attribute on Thursday from 6 PM to 12 midnight are assumed to depend on the number of requests for Internet resources having the particular attribute on the previous Thursday from 6 PM to 12 midnight, and the number of requests for Internet resources having the particular attribute on Friday from 6 PM to 12 midnight are assumed to depend on the number of requests for Internet resources having the particular attribute on the previous Friday from 6 PM to 12 midnight. Basically, each hypothesis of the fifth group assumes that the requests for Internet resources having the particular attribute type on a weekday evening will depend on the requests for that type of Internet resource during that same weekday evening in the previous week.

Lastly, the sixth "group" of similar dependence hypotheses includes one hypothesis; namely, that the number of requests for Internet resources having a certain attribute type from 12 noon to 6 PM on Sunday, will depend from the number of similar requests from 12 noon to 6 PM on Saturday.

Referring back to FIG. 2, once a hypothesis table 500 is entered, a hypothesis correlation process 230, a weight determination process 240, and a forecast determination process 220 are carried out. Finally, a global forecast determination process 250 is carried out. Each of these processes will be described below.

Each dependence hypothesis entered assumes that two variables are related, i.e., that one variable depends on the other. For example, the number of requests for resources having a particular attribute on Monday evenings may be assumed to be related to the number of requests for resources having the attribute on the previous Monday evening. To test each hypothesis or assumption, a correlation between the variables is determined from the known (historical data) based on known linear regression techniques. A correlation coefficient "r" may be expressed as:

$$r = \frac{N \sum_{i=1}^{N} x_i y_i - \sum_{i=1}^{N} x_i \sum_{i=1}^{N} y_i}{\sqrt{N \sum_{i=1}^{N} x_i^2 - \left(\sum_{i=1}^{N} x_i\right)^2} \sqrt{N \sum_{i=1}^{N} y_i^2 - \left(\sum_{i=1}^{N} y_i\right)^2}}$$

Where y=the dependent variable (e.g., number of requests on a Monday evening);

x=the independent variable (e.g., number of requests on the previous Monday evening); and N=the number of x,y pairs of known data.

If r=1, the correlation is perfect, if r=0, there is no correlation and if r=1, the variables are negatively correlated.

A correlation for a similar group of hypotheses may be similarly determined. Thus, for example, x may be defined as the number of requests on each of a Monday evening, a Tuesday evening, a Wednesday evening, a Thursday evening, and a Friday evening, and y may be defined as the number of requests on each of the previous Monday, Tuesday, Wednesday, Thursday, and Friday evenings.

Although correlation based on a linear regression was described, other types of curve regressions and correlations may be applied. Assuming that known linear regression techniques are used, linear regression coefficients ("a"—the slope of the line, and "b"—the y intercept of the line) are determined. More specifically, assuming that there is a linear relationship between x and y, namely y=ax+b, the square root of (i) the sum of vertical deviations ($d_i=ax_i+b-y_i$) from the line, squared, and/or (ii) of the sum of horizontal deviations ($d_i'=a'y_i+b'-x_i$) from the line, squared, are minimized. The slope (a) of the line, squared, which minimizes the sum of squared vertical deviations may be expressed as:

$$a = \frac{N \sum_{i=1}^{N} x_i y_i - \sum_{i=1}^{N} x_i \sum_{i=1}^{N} y_i}{N \sum_{i=1}^{N} x_i^2 - \left(\sum_{i=1}^{n} x_i\right)^2}$$

The y intercept (b) of the line may be expressed as:

$$b = \frac{N \sum_{i=1}^{N} x_i y_i - \sum_{i=1}^{N} x_i \sum_{i=1}^{N} y_i}{N(N-1)s_1^2}$$

where $s_1^2$ is defined as:

$$s_1^2 = \frac{1}{N-1} \left[ \sum_{i=1}^{N} x_i^2 - \frac{1}{N}\left(\sum_{i=1}^{N} x_i\right)^2 \right]$$

The use of the linear regression coefficients will be described below in the forecast determination process 220 description.

Referring back to FIG. 2, a correlation corresponding to each group of similar dependence hypotheses is provided to a correlation display process 214 for display on output means 260.

The determination of a weight associated with a group of similar dependence hypotheses will now be described. Basically, the weight associated with a particular group of similar dependence hypotheses ($W_{SDHG}$) is based on the correlation associated with that group of similar dependence hypotheses ($r_{SDHG}$) and the size of the sample of known (historical) data used to determine the correlation ($N_{SDHG}$). More specifically, the weight may be determined as:

$$W_{SDHG} = r_{SDHG}^2 * N_{SDHG}$$

In one embodiment, the weight associated with a group of similar dependence hypotheses will consider an average number of time intervals between the variables of each hypothesis in the group of similar dependence hypotheses. Referring to similar dependence hypotheses group 4 of FIG. 5b for example, one hypothesis—that requests on Monday evening will depend on requests on the previous Sunday evening—has a time lag ($TL_1$) of four (4) time intervals (Sunday midnight to 6 AM Monday, 6 AM Monday to 12 noon Monday, 12 noon Monday to 6 PM Monday, and 6 PM Monday to 12 midnight Monday), and the second hypothesis—that request on Tuesday evening will depend on request on the previous Sunday evening—has a time lag ($TL_2$) of eight (8) time intervals. Thus, the average time lag for the fourth group of similar dependence hypotheses ($TL_{SDHG4}$) is six (6). This alternative weight may be determined as:

$$W_{SDHG} = r_{SDHG}^2 * N_{SDHG} * TL_{SDHG}$$

The forecast determination process 220 receives (i) linear regression coefficient(s) ("a" and "b") from the hypothesis correlation process 230 and (ii) actual values upon which the forecast value is believed to depend. A forecast value may be determined based on a known value(s) with which the forecast value is thought to depend. For example, referring back to FIG. 5b, the number of requests for resource(s) of a particular attribute on Tuesday evening is expected to depend on the number of requests for resource(s) of the attribute type on the previous Tuesday and Sunday evenings (See, e.g., hypothesis of group 5 and group 4.). Individual forecasts ($Y_{SDHG}$) based on each group of similar dependence hypotheses may be determined as follows:

$$y_{SDHG} = a_{SDHG} x_{previous\ known} + b_{SDHG}$$

Hence, each similar dependence hypotheses group generates a forecast.

The global forecast determination process 250 can determine a global forecast ($Y_{global\ forecast}$) from the individual forecasts from each of the groups of similar hypotheses. The individual forecasts are weighted when determining the global forecast. More specifically, the global forecast ($Y_{global\ forecast}$) may be expressed as:

$$Y_{global\ forecast} = \frac{\sum_{HG \in all\ groups\ of\ similar\ dependence\ hypotheses} W_{SDHG} y_{SDHG}}{\sum_{HG \in all\ groups\ of\ similar\ dependence\ hypotheses} W_{SDHG}}$$

$$= \frac{\sum_{HG \in all\ groups\ of\ similar\ dependence\ hypotheses} W_{SDHG}(a_{SDHG} x_{previous} + b_{SDHG})}{\sum_{HG \in all\ groups\ of\ similar\ dependence\ hypotheses} W_{SDHG}}$$

Referring back to FIG. 2, the global forecast value may be provided to the similar dependence hypotheses forecast display process 218 which may display the forecast on the output means 260. More specifically, the actual data and the global forecasts may both be plotted, with the forecast extending temporally beyond the actual data.

§4.3 EXAMPLE OF OPERATION

Figure 6:
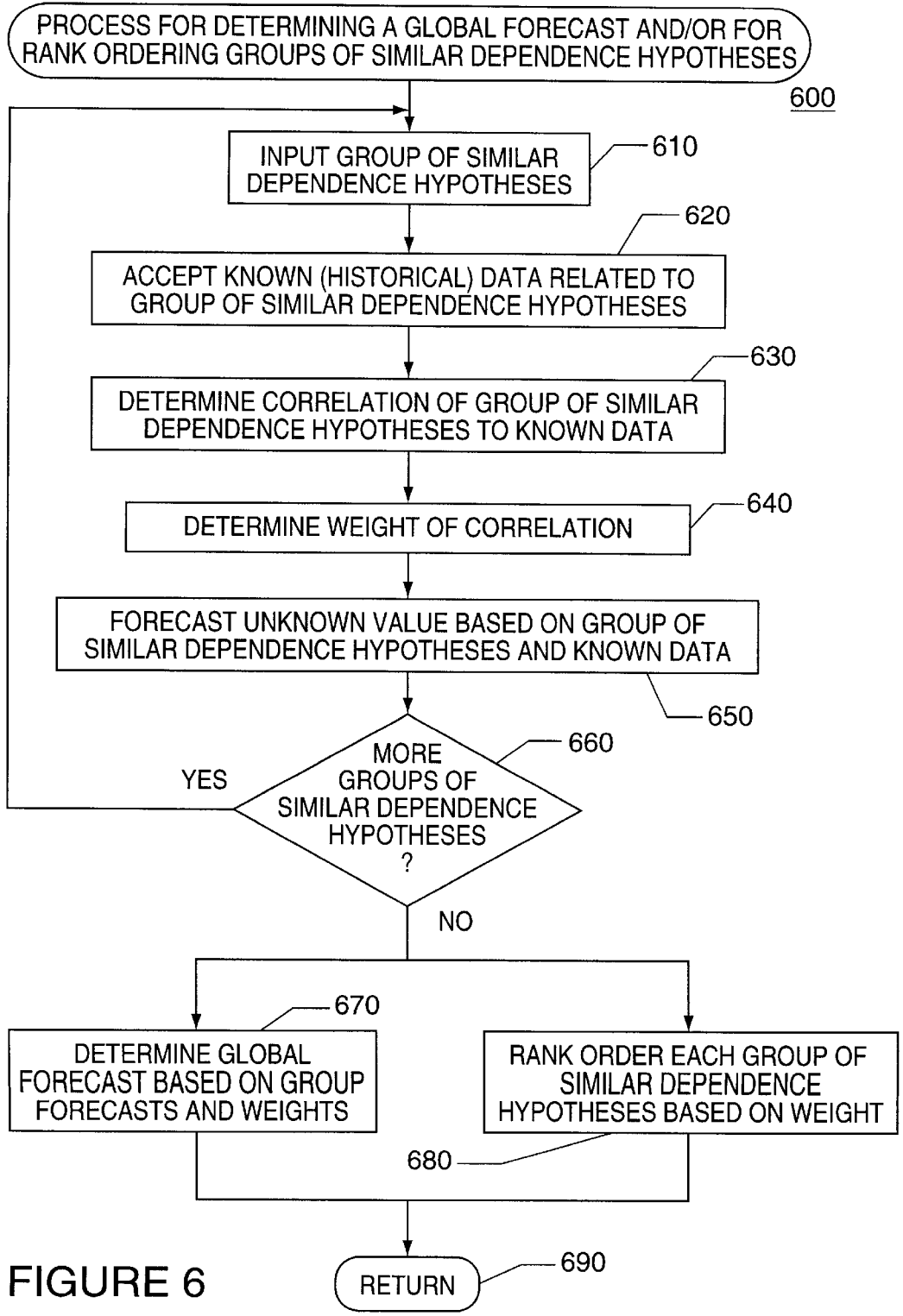
FIG. 6 is a flow diagram of a process for forecasting values and/or rank ordering groups of similar dependence hypotheses.
Figure 7A:
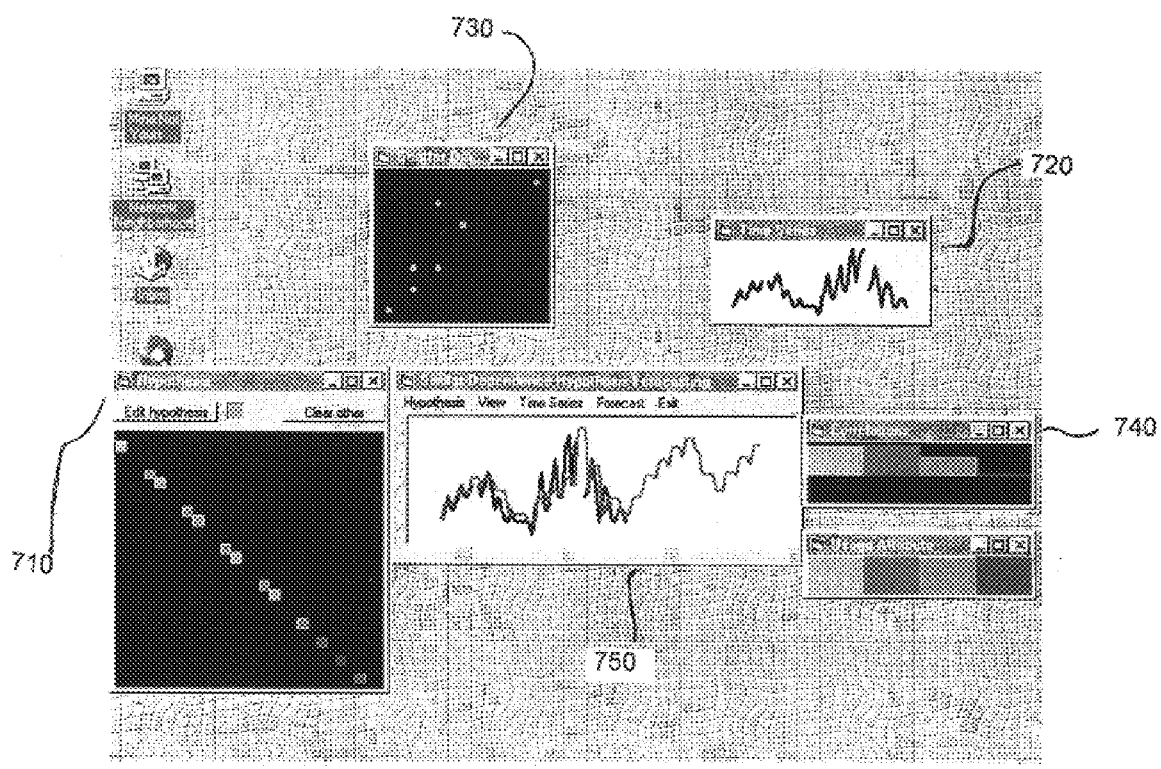
FIGS. 7a through 7d depict a display of a user interface when various groups of similar dependence hypothesis are entered.
Figure 7B:
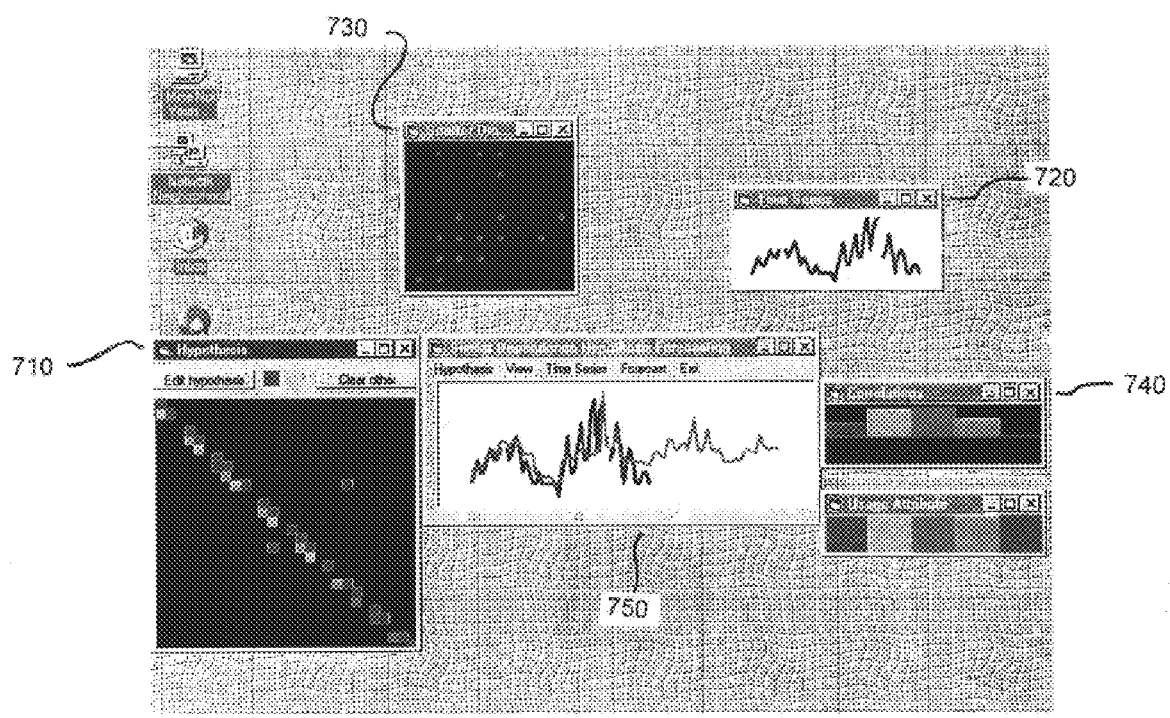
Figure 7C:
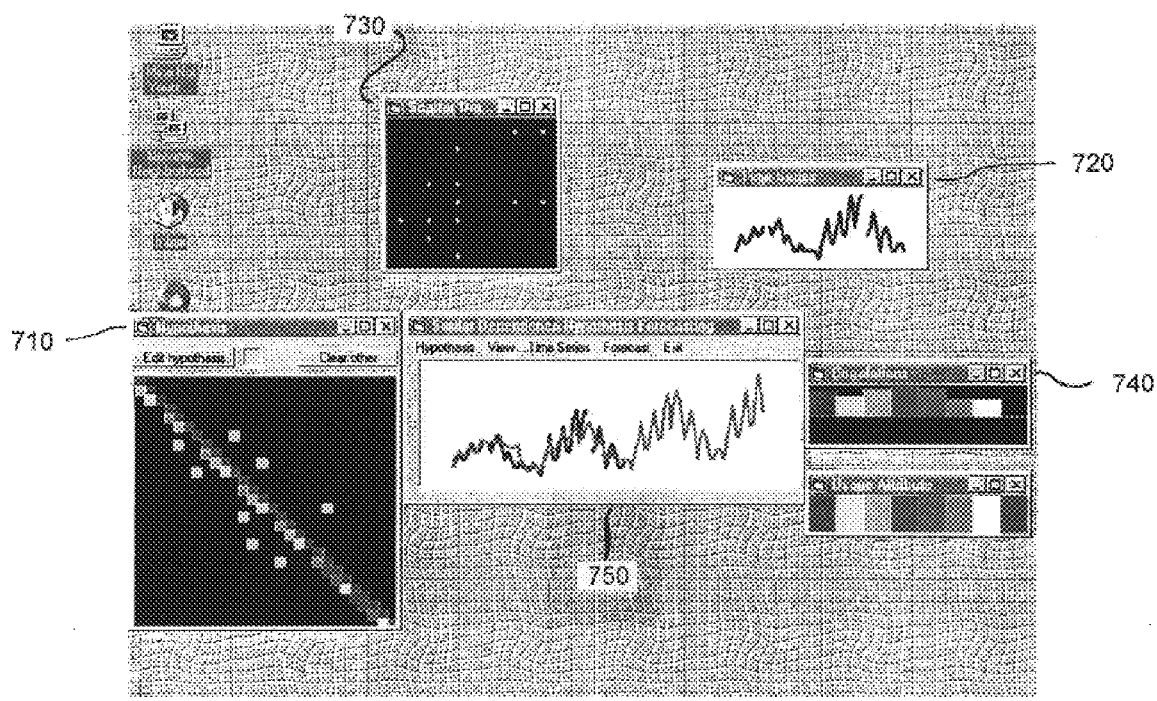
Figure 7D:
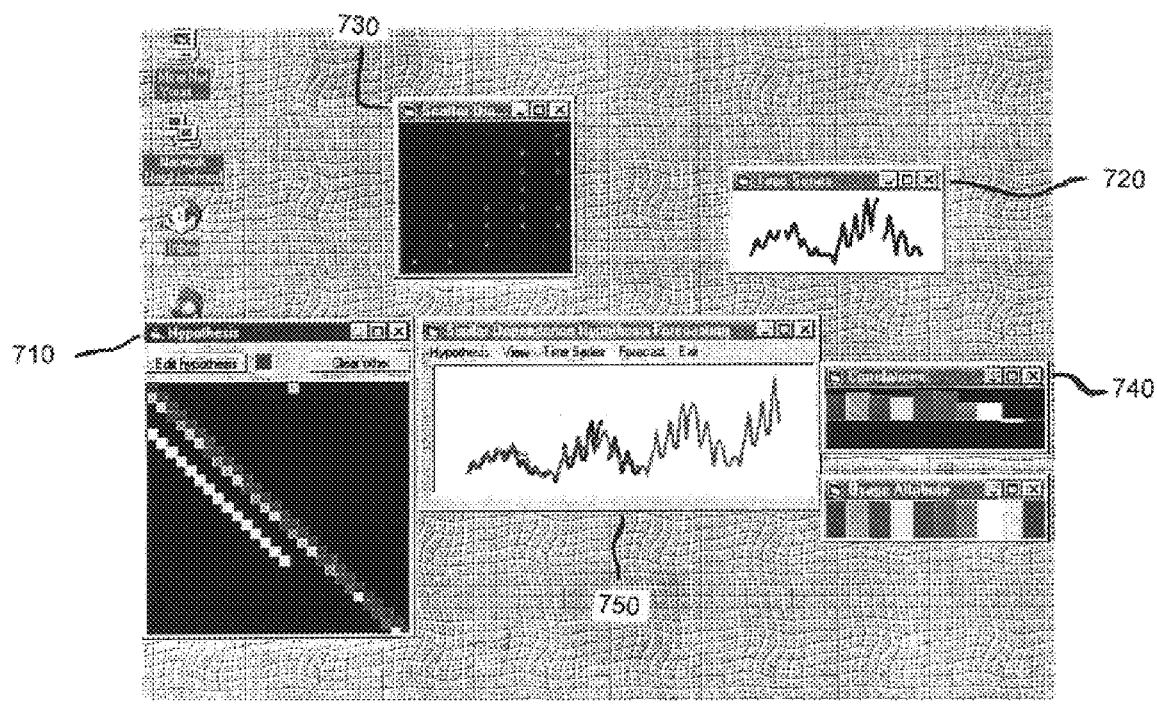

FIG. 6 is a flow diagram of a process 600 for forecasting values and/or for rank ordering groups of similar dependence hypotheses. First, as shown in step 610, a group of similar dependence hypotheses is input. Recall the input tables 500 and 500' of FIGS. 5a and 5b, respectively. Next, as shown in step 620, known (historical) data related to the similar dependence hypotheses of the group are accepted. Then, as shown in step 630, a correlation of the group of similar dependence hypotheses to the known data is determined. Next, as shown in step 640, a weight of the correlation is determined based on the sample size of known data. As discussed above, an average time lag may also be considered when determining the weight.

Next, as shown in optional step 650, an unknown value is forecast based on the group of similar dependence hypotheses and at least one piece of known data. As shown in decision process 660, if more groups of similar dependence hypotheses are to be entered, processing continues at step 610. Otherwise processing continues at step 670 and/or step 680. As shown in step 670, a global forecast is determined based on the group forecasts (See step 650) and group weights. As shown in step 680 each group of similar dependence hypotheses may be rank ordered based on weight. Processing continues at return node 690.

FIGS. 7a through 7d show a display of a user interface when various groups of similar dependence hypotheses are entered. Display area 710 corresponds to the table 500 of FIG. 5a. In the display area 710, each hypothesis is depicted by a square block, and similar dependence hypotheses are depicted by a single color. Display area 720 is a plot of the known data. Display area 730 is a scatter diagram of the known data to which a group of similar dependence hypotheses is applied. The color of the points of the scatter diagram corresponds to the color with which the group of similar dependence hypotheses is depicted in display area 710. Recall that a linear regression is performed on the points of the scatter diagram. Display area 740 provides a graphical depiction of the relative correlations of each of the groups of similar hypotheses. The taller the bar, the more highly correlated the data. Again, the colors of the bars correspond to the colors with which the groups of similar dependence hypotheses are depicted in display area 710. Finally, display area 750 depicts (global) forecast values in red, and known (historical) values in black. Although not shown, the individual forecast values may be shown in a color corresponding to the color with which the relevant group of similar dependence hypothesis are depicted in display area 710.

Thus, the present invention provides a tool for forecasting events that are not time-homogeneous. Hypotheses for making such forecasts can be easily entered (Recall, for example, display area 710 and tables 500 and 500'.), the relative value of each group of similar hypotheses can be seen (Recall, for example, display areas 730 and 740.), and forecasts made from the groups of similar dependence hypotheses can be compared to known (historical) data (Recall, for example, display area 750.).

What is claimed is:

1. In an apparatus having a graphical user interface including a display device and a user input device, a method for entering and displaying at least one group of similar dependency hypotheses related to a temporal relationship between values of first and second variables, wherein the first and second variables represent requests for correspondingly different resources for use in a computer system, the method comprising steps of:
- a) displaying, on the display device, a two dimensional rectangle having a first side corresponding to time segments over a period of past time and a second side, perpendicular to the first side, corresponding to time segments over a period of future time;
- b) receiving a group of user selections, via the user input device, each of which relates a future time segment on the second side of the rectangle to a past time segment on the first side of the rectangle, thereby forming a group of similar dependency hypotheses such that values of the first variable during each of future time segments will depend on values of the second variable during a related one of each of the past time segments over all of said hypotheses; and
- c) displaying, on the display device, points on the two dimensional rectangle corresponding to the group of user selections received, wherein each of the points represents an associated pair of the first and second variables of a corresponding similar dependency hypothesis.

2. The method of claim 1 wherein all points corresponding to the group of selections received are displayed in one color.

3. The method of claim 1 wherein more than one group of selections may be received, and
wherein points corresponding to different groups of selections are displayed, on the display device, in different colors.

4. The method of claim 1 wherein each of the first and second sides of the two dimensional rectangle is divided into time segments over a week.

5. The method of claim 4 wherein each of the time segments is a six-hour time slot.

6. The method of claim 1 further comprising a step of receiving, via the user input device, user definitions of at least one of (a) the period of past time, (b) the time segments of the period of past time, (c) the period of future time, and (d) the time segments of the period of future time.

7. The method of claim 1 further comprising a step of:
- d) displaying, on the display device, a bar, wherein a length of the bar corresponds to a correlation of known data corresponding to the group of similar dependency hypotheses.

8. The method of claim 7 wherein all points corresponding to a group of selections received are displayed in one color, and
wherein the bar is displayed in the same color as the points on the two dimensional rectangle corresponding to the group of selections received.

9. The method of claim 1 further comprising a step of:
- d) displaying, on the display device, a plot of known data related to the group of similar dependency hypotheses.

10. The method of claim 1 further comprising a step of:
- d) displaying, on the display device, a forecast of future values of the variable based on the group of similar dependency hypotheses.

11. The method of claim 1 wherein the values of the variable are numbers of requests for an Internet resource, during particular time periods.

12. The method of claim 1 wherein the values of the variables are numbers of requests for Internet resources of a particular attribute type, during particular time periods.

13. A method for generating a global forecast of a request for a resource for use in a computer system, the method comprising steps of:
- a) accepting at least one group of similar dependency hypotheses, wherein each hypothesis of a group assumes that a value of a first variable during a future time period will depend on a value of a second variable during a past time period, wherein the first and second variables represent requests for correspondingly different resources for use in the system;
- b) for each one of the at least one group of similar dependency hypotheses accepted:
  - i) accepting known data related to the one of the at least one group of similar dependency hypotheses;
  - ii) determining a correlation between the first and second variables of the known data related to the one of the at least one group of similar dependency hypotheses; and
  - iii) determining a corresponding one weight of the correlation, said one weight being one of a plurality of weights; and
- c) determining the global forecast based on each of the at least one group of similar dependency hypotheses, the known data related to each of the at least one group of similar dependency hypotheses, and each of the plurality of weights.

14. The method of claim 13 wherein the weight is determined based on the correlation and a number of known data used to determine the correlation.

15. The method of claim 13 wherein the weight is determined based on the correlation, a number of known data used to determine the correlation, and an average time between the past time periods and the related future time periods of the hypotheses of the one of the at least one group of similar dependency hypotheses.

16. A method for generating a global forecast of a request for a resource for use in a computer system, the method comprising steps of:
- a) accepting at least one group of similar dependency hypotheses, wherein each hypothesis of a group assumes that a value of a first variable during a future time period will depend on a value of a second variable during a past time period, wherein the first and second variables represent requests for correspondingly different resources for use in the system;
- b) for each one of the at least one group of similar dependency hypotheses accepted:
  - i) accepting known data related to the one of the at least one group of similar dependency hypotheses;
  - ii) determining a correlation between the first and second variables of the known data related to the one of the at least one group of similar dependency hypotheses;
  - iii) determining a corresponding one weight of the correlation, said one weight being one of a plurality of weights; and
  - iv) forecasting an unknown value based on the one of the at least one group of similar dependency hypotheses and the known data related to the one of the at least one group of similar dependency hypotheses so as to define a corresponding one of a plurality of forecasts; and
- c) determining the global forecast based on each of the plurality of said forecasts and each of the plurality of weights.

17. The method of claim 16 wherein the weight is determined based on the correlation and a number of known data used to determine the correlation.

18. The method of claim 16 wherein the weight is determined based on the correlation, a number of known data used to determine the correlation, and an average time between the past time periods and the related future time periods of the hypotheses of the one of the at least one group of similar dependency hypotheses.

19. A method for generating a rank ordered list of groups of similar dependency hypotheses of requests for resources for use in a computer system, the method comprising steps of:

a) accepting groups of similar dependency hypotheses, wherein each hypothesis of a group assumes that a value of a first variable during a future time period will depend on a value of a second variable during a past time period, wherein the first and second variables represent requests for correspondingly different resources for use in the system;

b) for each one of the groups of similar dependency hypotheses accepted:
    i) accepting known data related to the one group of the groups of similar dependency hypotheses;
    ii) determining a correlation between the first and second variables of known data related to the one group of the groups of similar dependency hypotheses, and
    iii) determining a weight of the correlation so as to define a corresponding one of a plurality of weights; and c) rank ordering the groups of similar dependency hypotheses based on each of the plurality of weights.

20. The method of claim 19 wherein the weight is determined based on the correlation and a number of known data used to determine the correlation.

21. The method of claim 19 wherein the weight is determined based on the correlation, a number of known data used to determine the correlation, and an average time between the past time periods and the related future time periods of the hypotheses of the one group of the groups of similar dependency hypotheses.

22. A device for entering and displaying at least one group of similar dependency hypotheses related to a temporal relationship between values of variables for requests for resources in a computer system, the device comprising:

a) an input device for accepting a user input of the at least one group of similar dependency hypotheses, wherein each hypothesis of a group assumes that a value of a first variable during a future time period will depend on a value of a second variable during a past time period, wherein the first and second variables represent requests for correspondingly different resources for use in the system;

b) a hypothesis generator, coupled with the input device, for processing the user input of the at least one group of similar dependency hypotheses;

c) an output device, coupled with the hypothesis generator, for rendering the user input of the at least one group of similar dependency hypotheses; and d) a hypothesis correlator, coupled with the input device, for receiving known data and for determining a correlation between the first and second variables of the known data related to each of the at least one group of similar dependency hypotheses.

23. The device of claim 22 wherein the output device further renders the at least one correlation determined.

24. The device of claim 22 further comprising:

e) a weight generator, coupled with the hypothesis correlator, for determining a weight corresponding each of the at least one correlation.

25. The device of claim 24 wherein the weight is determined based on the correlation, a number of known data used to determine the correlation, and an average time between the past time periods and the related future time periods of the hypotheses of the one of the at least one group of similar dependency hypotheses.

26. The device of claim 22 further comprising:

e) a weight generator, coupled with the hypothesis correlator, for determining a weight corresponding each of the at least one correlation, based on the correlation and a size of the known data used to determine the correlation.

27. The device of claim 26 further comprising:

f) a forecast generator, coupled with (i) the hypothesis correlator and (ii) the weight generator, for forecasting a value based on the known data, the at least one weight, and the at least one correlation.

28. The device of claim 26 further comprising:

f) a forecast generator, coupled with (i) the hypothesis correlator and (ii) the weight generator, for forecasting a value based on the known data, each of the at least one weight, and each of the at least one correlation.

* * * * *